United States Patent

[11] 3,616,892

| [72] | Inventors | Wolfgang Koennecke<br>bad Homburg Vor-der Hohe;<br>Reinhold Strickler, Frankfurt am Main,<br>both of Germany |
|---|---|---|
| [21] | Appl. No. | 844,764 |
| [22] | Filed | July 25, 1969 |
| [45] | Patented | Nov. 2, 1971 |
| [73] | Assignee | Flughafen Frankfurt am Main<br>Aktiengesellschaf<br>Flughafen, Frankfurt am Main, Germany |
| [32] | Priority | Aug. 1, 1968 |
| [33] | | Germany |
| [31] | | P 17 56 914.1 |

[54] RAIL SWITCHES FOR PALLET CONVEYOR SYSTEMS
5 Claims, 6 Drawing Figs.

[52] U.S. Cl. .................................................. 198/78,
198/79, 198/80, 198/185
[51] Int. Cl. .................................................. B65g 37/00
[50] Field of Search ........................................... 198/78, 79,
80, 31 AG, 185; 193/36

[56] References Cited
UNITED STATES PATENTS

| 1,022,823 | 4/1912 | Buck | 193/36 |
| 1,824,276 | 9/1931 | Kesti | 193/36 |
| 2,794,529 | 6/1957 | Schmitz | 193/36 |
| 3,093,236 | 6/1963 | McLaughlin | 198/185 |
| 3,164,239 | 1/1965 | Reed | 198/185 |
| 3,416,640 | 12/1968 | Svobida | 198/31 AC |
| 3,484,655 | 12/1969 | Peltier | 198/31 AC |

*Primary Examiner*—Harvey C. Hornsby
*Assistant Examiner*—Merle F. Maffei
*Attorney*—Christen and Sabol ABSTRACT: A switching mechanism for conveyors of the type wherein a pair of parallel rails guides a series of pallets supported and moved on a series of fixed-axis wheels includes movable guide tongues for diverting a pallet on to a side track or vice versa. The rails may also be slightly displaced at the switch to facilitate transfer from track to track.

RAIL SWITCHES FOR PALLET CONVEYOR SYSTEMS

The invention relates to a set of switches for a conveyor for channel-shaped pallets, the conveyor comprising drive wheels generally acting on the underside of the pallets and arranged in support rails, wherein the drive wheels have one special drive per support rail, derived from a main drive chain arranged between the rails, and wherein the pallets have four downwardly projecting guidance elements, or runners in the region of their undersides, for engagement in rails for lateral and vertical guidance, provided on the support rails according to U.S. Pat. application No. 844,795, filed by the same applicants concurrently with this application, entitled "Pallet Conveyor."

In conventional roller conveyors the pallets are directed out of a straight main line into a branch line through the action on the bottoms of the pallets of a row of small driven rollers, which project from the branch line into the center of the main line. The rollers are seated on a connecting frame which is moved by electromagnets or pneumatic means. The rollers at an angle to the main lines are moved by a chain; they run with their undersides on a level surface and drive the pallet forward in the opposite direction to the movement of the chain.

The basic disadvantage of having the rollers rising together is that, when the pallets follow close on one another and the second pallet is to go straight forward after a pallet which has been diverted, this second pallet is caught up by the small inclined rollers and turned slightly sideways, as the whole row of rollers is still raised, in order to guide the first pallet to a side rail.

Another drawback of such arrangements is that the pallets are only raised approximately in the center, while there sides continue to run on rollers driving straightforwards, so that the pallets are not accurately diverted sideways by the raised rollers. Nevertheless, such conveyors do not include any means for guiding the pallets laterally into the curve at the branching-out point. In practice, therefore, the pallets are often turned sideways, particularly if they follow one another closely, and have to travel at slightly higher speeds such as 1 meters per second.

According to the invention, a tongue which is rotatable about an axis vertical to the base and is adapted to be acted on radially, is hinged onto the outside of the rails at the transition from a main line to a branch line, in the region of the intersection between the outer branch rail and the outer main line rail, virtually all the drive wheels in the region of the switches are driven, and the running surfaces of the pallets are designed to project from the undersides of the pallets by more than the maximum deformation of the wheels.

The result is that the pallets which have to be diverted are both guided laterally and driven virtually throughout the whole set of switches. If a pallet should come to a standstill on such a set, for example in the case of a power failure, it could continue its journey from any part of the switch without any additional external aids when the drive is restored.

Embodiments of the invention will now be described by way of example with reference to the accompanying drawings in which.

Figure 1:
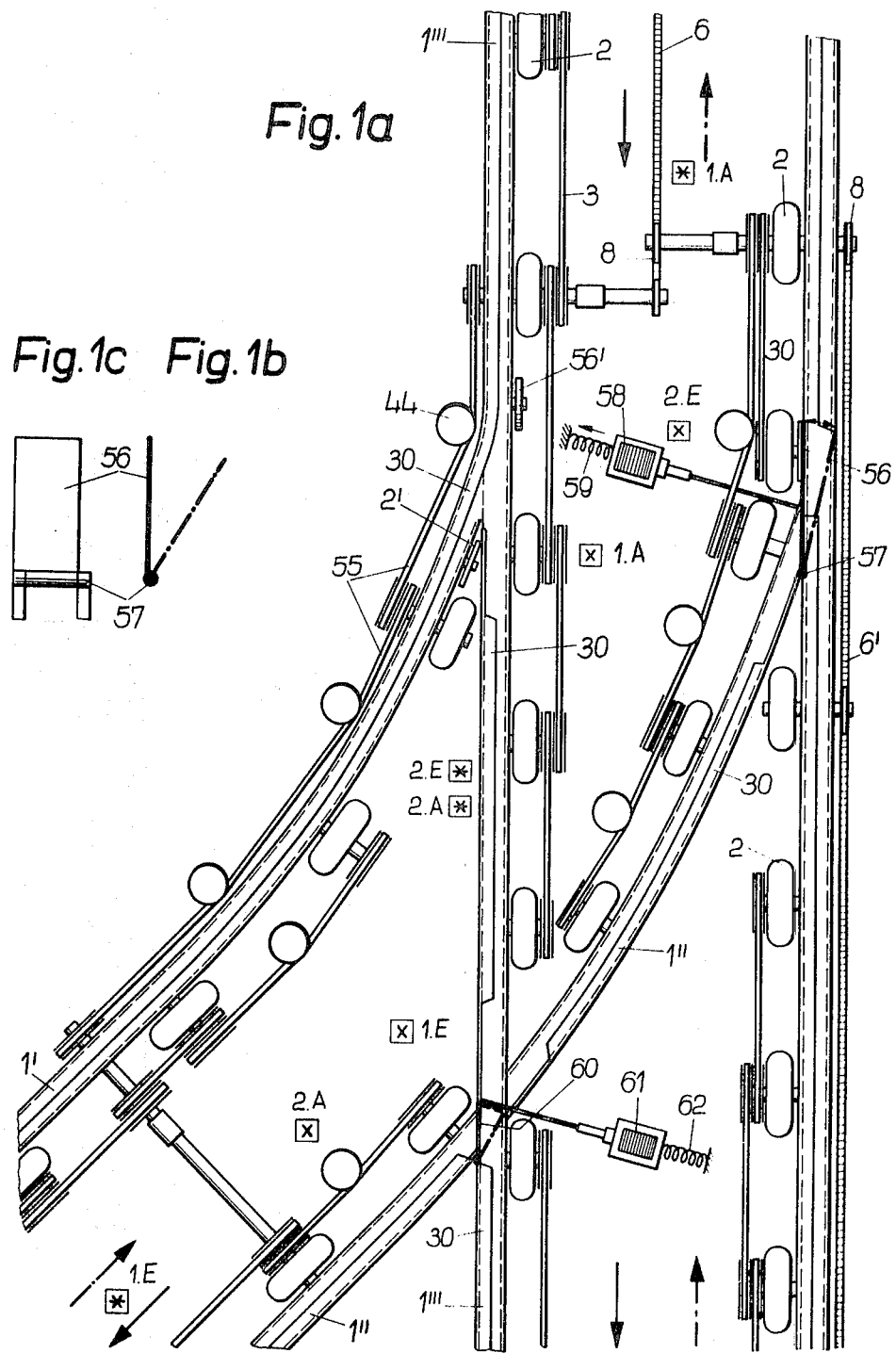
FIG. 1a is a plan view of a set of switches according to the invention.
FIG. 1b is a larger scale view, also in plan, of a tongue provided in FIG. 1.
FIG. 1c is a side elevation of the tongue.

The set of switches described below may be incorporated in straight or main lines or lengths of track as described and illustrated in our copending US. Pat. application No. 844,795 for "Pallet Conveyor," the pallets being laterally guided in the upper parts of the support rails 1 a downwardly projecting guidance element, such as by their runners 27, and the drive being provided by wheels 2 which are driven by V-belts 3.

At curves or branch lines, the V-belts 3 are moved into the required direction by means of perpendicular deflection pulleys 44. The drive is provided by the main drive chain 6 extending throughout the initial straight line portion of the conveyor. At the set of switches, it is taken, by a shaft and sprockets 8, onto the outside of the support rail 1, where it extends for a short distance as a secondary chain 6'.

The drive wheels 2 are arranged at the set of switches in such a way that the relatively narrow running surfaces 21 of the pallets 18 never rest on more than one row of wheels 2; that is to say, on the straight line portion they rest on the wheels 2 fixed to the straight rails, while the pallets which are diverted into the curve are carried by the wheels 2 fixed to the curved support rails 1', 1''.

Only in the case of the drive wheels 2 located in the approach to the branch line is there a slight lateral movement over the running surfaces 21 when a pallet 18 is guided into the curve. All the wheels 2 are driven by V-belts 3, which are in turn driven either by the main drive chains 6, 6' or, at the curve, by the adjacent V-belt drive 55. Only at the point where the inner curved support rail 1' joins the straight rail is a small idle wheel 2' fitted for support purposes. The pallets 18 are directed into the straight line or into the curve by a first vertical tongue 56, which is mounted for rotation about a shaft 57 perpendicular to the base and is actuated by an electromagnet 58. In the deenergized condition it is pulled back to the straight position by a return spring 59. The tongue spans the whole height of the support rails 1, on which the lateral guiding runners travel. Where this lateral guidance is terminated at the passage between the opposed straight rail 1''' and the outer curved rail 1'' a tongue 60 may be provided, for travel into the curve the tongue 60 is then drawn into the curve by a second electromagnet 61, so that the pallets 18 are virtually fully guided. The electromagnet 61, which in this case attracts, acts against a return spring 62, which draws the tongue 60 back to the straight position. The two magnets 58 and 61 are operated by means of feeler switches which move over the center of the undersides of the pallet 18. Of the eight switches illustrated, those marked with A are turned on when the set of switches in FIG. 1a are used for deflecting the pallets out of the straight direction, while the switches marked with E are turned on when the set of points are used in reverse for guiding the pallets into the straight direction. The "on" switches, which turn on the current for the electromagnets 58 and 61 are marked as "*" and the "off" switches, which turn off the magnets 58 and 61 as the bottom of the pallet moves over them, are marked as "X."

When the set of switches are used for deflecting pallets out of the straight line, the magnets 58 must first be energized by the first switch *1A and the magnet 62 by the second switch *2A.

The switch *1A is connected in series with a computer, so that the electromagnet 58 responds only when the computer has given the "deflection" order. The magnet 58 is deenergized by the first "off" switch X1A, on contact with the bottom of the pallet, and the computer is also disconnected. The second magnet 61 is deenergized by the second "off" switch X2A, when the bottom of the pallet moves over it. When the pallets 18 move in the reverse direction, i.e., when the set of switches in FIG. 1 are used for pallets moving from the branch line into the main line, the magnets are energized by switchs *1E and *2E, and deenergized by X1E and X2E, the switches being arranged in different positions.

To summarize the description of FIG. 1a it may be said that the set of switches can be used for deflecting pallets either into or out of the straight direction. As already mentioned, the set of switches in FIG. 1a comprise a second tongue 60 in addition to the tongue 56. The the second tongue 60 is necessary particularly when the pallets 18 are to travel at high speeds, i.e. of over 2 meters per second.

The set of switches illustrated in FIG. 1a may be designed exclusively for deflecting pallets into the branch line i.e. for diverting pallets away from the straight direction. In this case, only two "on" and two "off" switches are necessary.

The set of switches may equally be used as so-caled "brancing-in" switches, i.e. for guiding pallets 18 out of the curved track and into the straight one. Here again, only two "on" and two "off" switches need be provided.

The above examples of sets of switches according to the invention are preferably designed for pallets 18 travelling at higher speeds. For lower speeds, particularly under 2 meters per second and for cases where the set of switches are travelled over in one direction only, it is advisable to use those shown in FIGS. 2 and 3 which are less expensive to construct.

Figure 2:
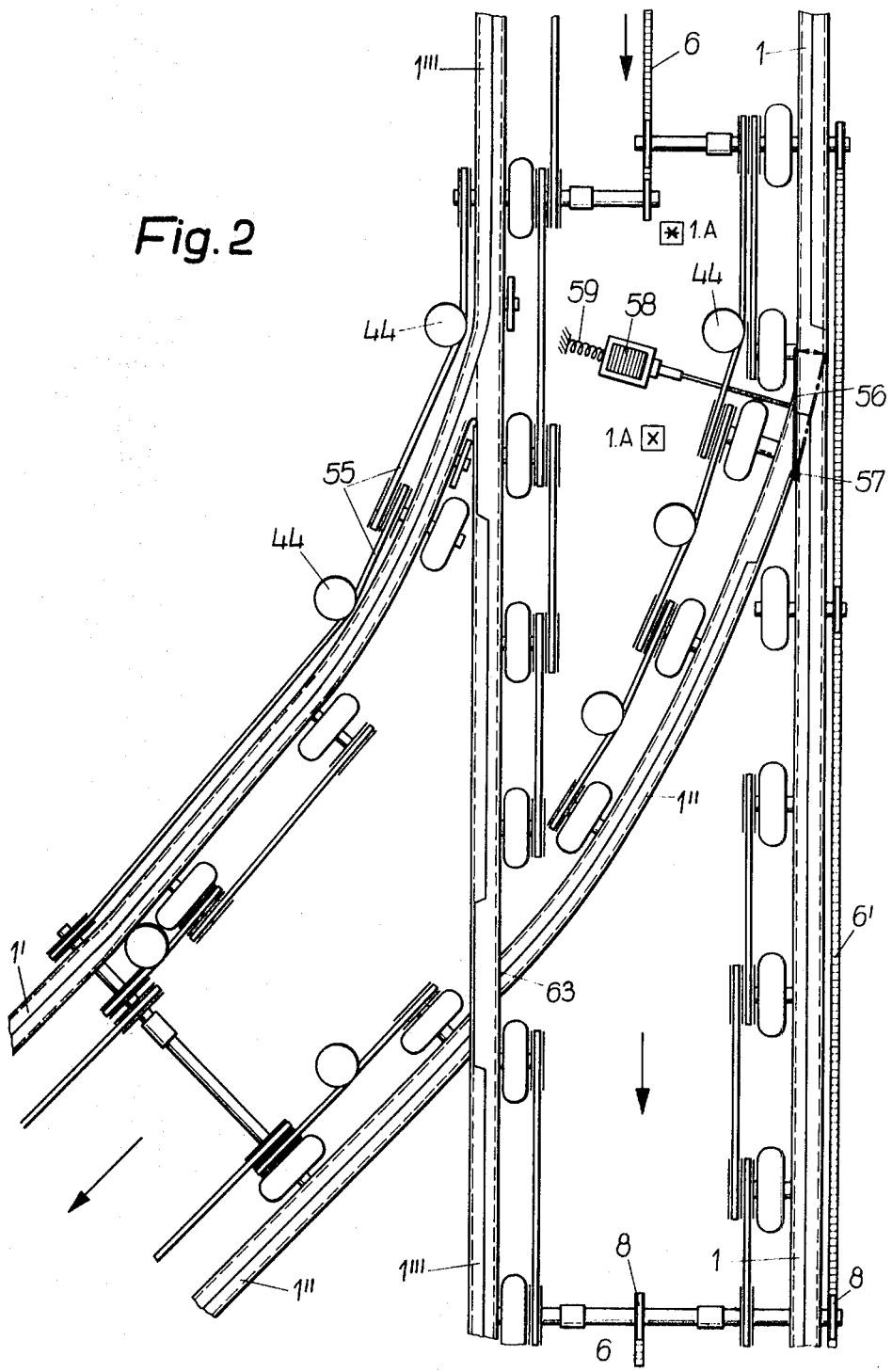
FIGS. 2 and 3 show other examples of the invention.

The points illustrated in FIG. 2 are for diverting pallets 18 from a straight to a branch line. As shown in the drawing, at the intersection between the outer (in respect of the center of the curve) branch rail and the inner mail line rail, a portion of the length of the curved outer branch rail is displaced inwardly towards the inside of the curve before the intersection with the opposite straight rail and is extended towards the outside of the curve after it.

Figure 3:
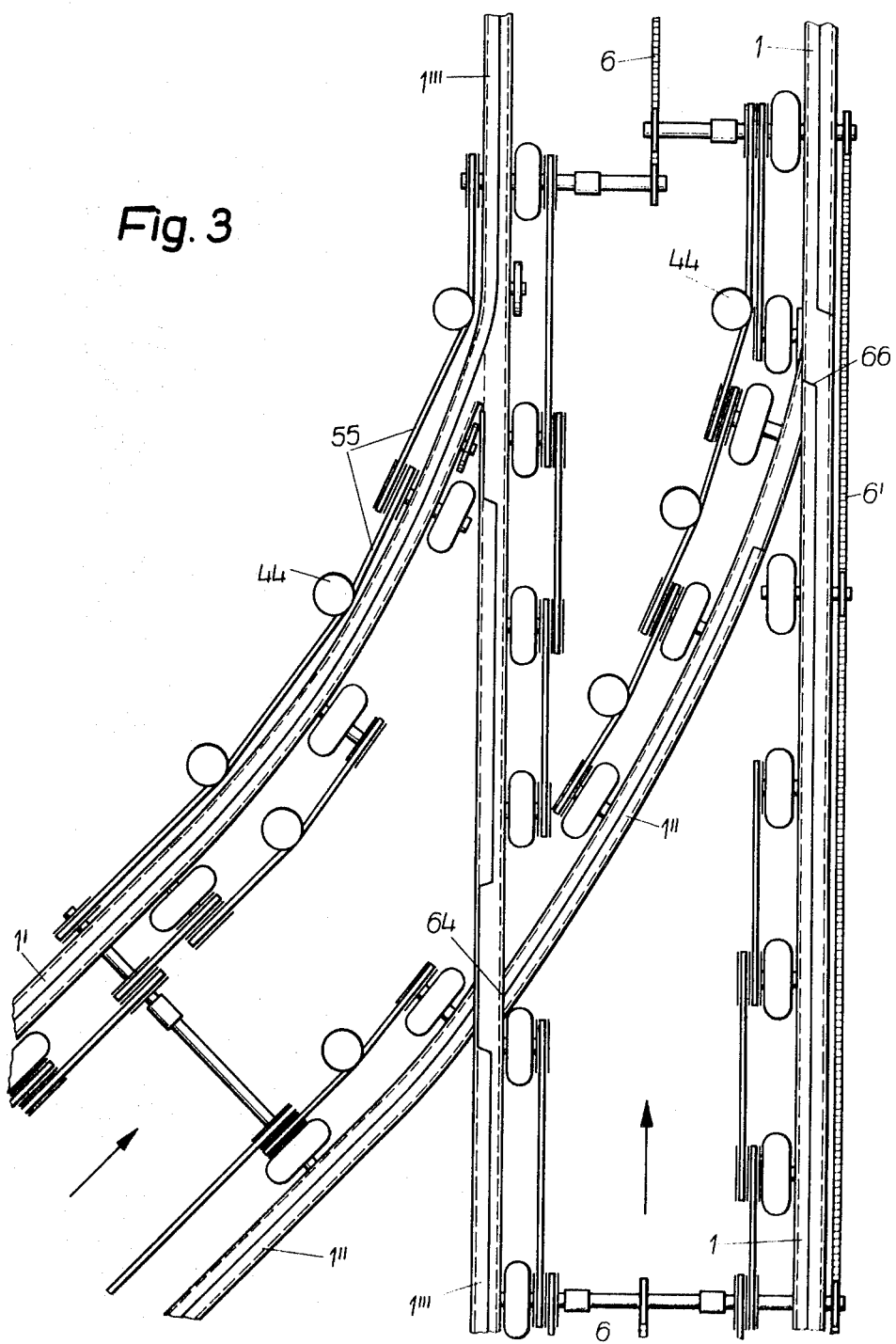
Figure 4:
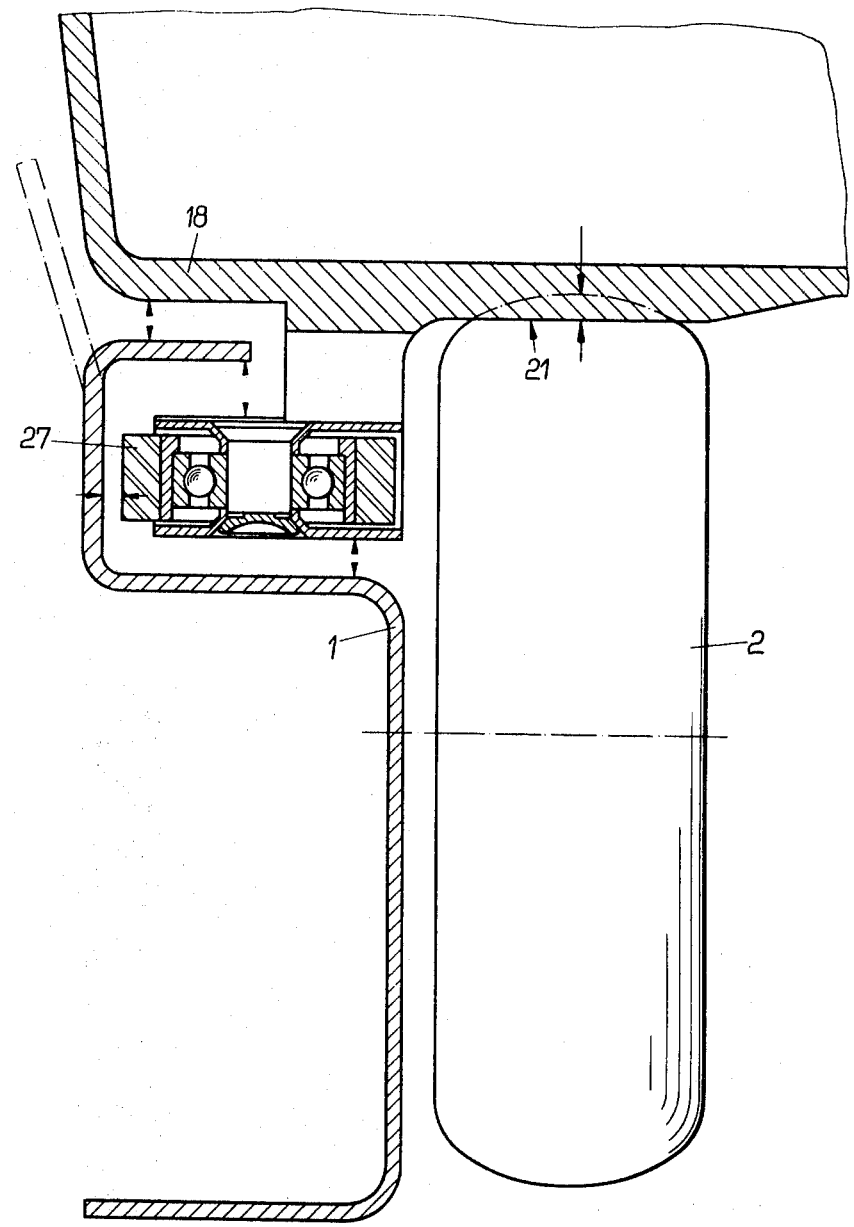
FIG. 4 is a fragmentary vertical section of a pallet used with the invention.

FIG. 3 shows a set of switches designed for conveying in the opposite direction. Here the relationship between the outer branch rail and the inner mail line rail is the exact reverse of those in FIG. 2.

In FIG. 3 moreover, in contrast to FIG. 2, the tongue 56 with its associated switches and the electromagnet 59, may be dispensed with.

The directions of travel which are possible with the sets of switches illustrated are indicated by arrows.

We claim:

1. Switching mechanism for a pallet conveyor for use with pallets of the type having an under surface to be supported upon and transported by a series of power driven wheels mounted on horizontally spaced fixed axes defining a longitudinally extending trackway and having at least one downwardly projecting guidance element, said trackway including a pair of parallel rails to provide lateral guidance for a pallet, said trackway including a straight section comprising a horizontally spaced pair of rails, said curved section merging with said straight section to provide a branch trackway, the combination including a tongue member for engagement with said depending guidance element on a pallet, said tongue member being mounted for swinging movement about a vertical axis adjacent the intersection of one of the rails of said straight section with the other rail of said curved section.

2. The invention defined in claim 1, wherein said switching mechanism also includes a second tongue member for engagement with a depending guidance element on a pallet, said second tongue member being mounted for swinging movement about a vertical axis adjacent the intersection of the other rail of said straight section with the outer rail of said curved section.

3. The invention defined in claim 1, wherein a portion of the length of the outer rail in said curved section of rails is laterally displaced inwardly adjacent the intersection of said outer rail.

4. The invention defined in claim 1, wherein said curved section of rails includes an outer rail disposed between the two rails forming said straight section of rails, said outer rail merging at one end with one of the rails of the straight section, said curved section also including inner and outer curved rails extending away from the other rail of the straight section at one side thereof, said last-mentioned of said outer rails being substantially a continuation of said first-mentioned outer rail, the other end of said first-mentioned outer rail being displaced laterally inwardly with respect to the last-mentioned outer rail adjacent the intersection with the other rail of said straight section.

5. The invention defined in claim 1, wherein said curved section of rails includes an outer rail disposed between the two rails forming said straight section of rails, said outer rail merging at one end with one of the rails of the straight section, said curved section also including inner and outer curved rails extending away from the other rail of the straight section at one side thereof, said first-mentioned of said outer rails being substantially a continuation of said last-mentioned outer rail intersecting the other rail of the straight section and being being displaced laterally inwardly with respect to the first-mentioned outer rail adjacent said intersection with the other rail of the straight section.

* * * * *